United States Patent
Ochi et al.

(10) Patent No.: US 11,346,546 B2
(45) Date of Patent: May 31, 2022

(54) SOLID FUEL BURNER AND COMBUSTION DEVICE

(71) Applicant: MITSUBISHI HITACHI POWER SYSTEMS, LTD., Yokohama (JP)

(72) Inventors: Kenichi Ochi, Yokohama (JP); Hitoshi Taniguchi, Yokohama (JP); Akira Baba, Yokohama (JP); Koji Kuramashi, Yokohama (JP); Kosuke Kitakaze, Yokohama (JP); Shohei Mito, Yokohama (JP); Hitoshi Kikuchi, Yokohama (JP)

(73) Assignee: MITSUBISHI POWER, LTD., Yokohama (JP)

( * ) Notice: Subject to any disclaimer, the term of this patent is extended or adjusted under 35 U.S.C. 154(b) by 230 days.

(21) Appl. No.: 16/612,059

(22) PCT Filed: Apr. 16, 2018

(86) PCT No.: PCT/JP2018/015722
§ 371 (c)(1),
(2) Date: Nov. 8, 2019

(87) PCT Pub. No.: WO2018/207559
PCT Pub. Date: Nov. 15, 2018

(65) Prior Publication Data
US 2020/0072461 A1    Mar. 5, 2020

(30) Foreign Application Priority Data
May 11, 2017    (JP) .............................. JP2017-094452

(51) Int. Cl.
*F23D 1/00*    (2006.01)
*F23B 30/00*    (2006.01)
(Continued)

(52) U.S. Cl.
CPC ................ *F23D 1/00* (2013.01); *F23B 7/002* (2013.01); *F23K 3/02* (2013.01); *F23L 1/00* (2013.01); *F23K 2201/10* (2013.01)

(58) Field of Classification Search
CPC .......... F23D 1/00; F23D 2201/20; F23K 3/02; F23K 2203/201
See application file for complete search history.

(56) References Cited

U.S. PATENT DOCUMENTS 5,799,594 A * 9/1998 Dernjatin .................. F23D 1/00
110/265
5,937,770 A   8/1999 Kobayashi et al.
(Continued)

FOREIGN PATENT DOCUMENTS

JP    8-5016 A    1/1996
JP    9-310809 A    12/1997
(Continued)

OTHER PUBLICATIONS

International Search Report dated Jun. 5, 2019, issued in counterpart International Application No. PCT/JP2018/015722 (2 pages).

*Primary Examiner* — David J Laux
(74) *Attorney, Agent, or Firm* — WHDA, LLP (57) ABSTRACT

This solid fuel burner is provided with: a venturi tube in which a channel for mixed fluid in a fuel nozzle narrows toward the center in the channel cross section; a fuel concentrator that imparts, to the mixed fluid, a velocity component away from the center of the fuel nozzle; and a channel separation member that separates the channel of the fuel nozzle into an internal side and an external side; wherein the channel separation member is shaped in such a way that the cross sectional area of an external channel is larger at the downstream end than at the upstream end, and the upstream end of the fuel concentrator is located between the upstream end and the downstream end of an expanded (Continued)

portion of the venturi tube. This solid fuel burner prevents solid fuel particles, which is ground biomass fuel, from adhering and depositing inside the nozzle.

7 Claims, 6 Drawing Sheets

(51) Int. Cl.
  *F23K 3/02* (2006.01)
  *F23L 1/00* (2006.01)

(56) References Cited

U.S. PATENT DOCUMENTS

| | | | | |
|---|---|---|---|---|
| 6,152,051 | A * | 11/2000 | Kiyama | F23D 1/00 110/262 |
| 6,237,510 | B1 * | 5/2001 | Tsumura | F23D 1/00 110/262 |
| 2003/0104328 | A1 | 6/2003 | Kobayashi et al. | |
| 2004/0211345 | A1 * | 10/2004 | Okazaki | F23C 7/004 110/261 |
| 2007/0079736 | A1 * | 4/2007 | Okazaki | F23C 7/004 110/264 |
| 2013/0291772 | A1 * | 11/2013 | Mine | F23J 15/02 110/347 |
| 2020/0056780 | A1 * | 2/2020 | Watanabe | F23C 7/006 |

FOREIGN PATENT DOCUMENTS

| | | |
|---|---|---|
| JP | 11-281010 A | 10/1999 |
| JP | 2003-240227 A | 8/2003 |
| JP | 2004-37072 A | 2/2004 |
| JP | 2005-24136 A | 1/2005 |
| JP | 2010-242999 A | 10/2010 |
| JP | 4919844 B2 | 4/2012 |
| JP | 2012-122653 A | 6/2012 |
| JP | 2012-255600 A | 12/2012 |
| JP | 2016-133224 A | 7/2016 |

* cited by examiner

SOLID FUEL BURNER AND COMBUSTION DEVICE

TECHNICAL FIELD

The present invention relates to a solid fuel burner which conveys and burns a solid fuel and a combustion device including the solid fuel burner, and particularly to a solid fuel burner and a combustion device which are suitable for fuel particles having a large particle size such as biomass particles.

BACKGROUND ART

As a method for improving ignitability of a solid fuel burner used in a boiler of a thermal power generation plant, etc., and increasing stability of a flame, there are methods of increasing a fuel concentration or increasing an oxygen concentration of a fuel carrier gas.

For example, Patent Document 1 (Japanese Patent Laid-Open Publication No. 2016-133224) discloses a solid fuel burner provided with a fuel condensation flow passage (12) for condensing and concentrating solid fuel particles around a flame holder (16) installed in an opening portion of a burner. Patent Document 1 describes a configuration in which the fuel condensation flow passage (12) has a flow passage cross-sectional area gradually enlarged in a radial direction toward a downstream side, and describes improving ignitability and combustibility due to a high concentration of a solid fuel or a reduction in a velocity thereof, by making a flow rate in a fuel condensation flow passage outlet (12b) be slower than an inlet (12a).

CITATION LIST

Patent Document

Patent Document 1: Japanese Unexamined Patent Application Publication No. 2016-133224 (paragraphs "0023"-"0026", "0034"-"0035", and FIG. 1)
Patent Document 2: Japanese Patent No. 4919844 (paragraphs "0021"-"0023")
Patent Document 3: Japanese Unexamined Patent Application Publication No. 2010-242999 (paragraph "0033")

SUMMARY OF INVENTION

Technical Problem

When using biomass fuel as the solid fuel used in the prior art described in the above Patent Document 1, currently, pellets made of wood-based raw materials are frequently used as a fuel for mixing and burning in a coal (pulverized coal)-fired boiler for thermal power generation in Japan. Herein, the pellets are not used as they are, but fuel particles obtained by pulverizing and classifying the pellets in an improved mill (crusher and classifier) based on a coal mill (pulverized coal machine) are conveyed to the solid fuel burner by means of the carrier gas, and a mixed fluid of fuel particles and carrier gas is supplied to the burner to be burned in the same manner as pulverized coal.

However, it is more difficult for the biomass fuel to be pulverized than the coal, and an excessive pulverization power of the mill is required (about 10 times the power of the coal is generally required to make the same particle size as the coal from wood chips having a particle size of 50 mm), as well as it may be difficult to atomize to the same level as the current pulverized coal. In addition, if the biomass fuel is pulverized, a possibility of rapid combustion is increased, and measures to prevent the same are required. Due to these reasons, the biomass fuel is discharged from the mill in a state of fairly coarser particles than the coal (see Japanese Patent Publication No. 4919844, and Japanese Patent Laid-Open Publication No. 2010-242999, etc.).

In the configuration described in Patent Document 1, the flow rate in the fuel condensation flow passage is reduced. However, if the flow rate is too reduced on an upstream side of the burner (fuel nozzle) in the biomass fuel having coarse particles, the fuel particles may be adhered to and deposited on structures, and the like inside the nozzle.

It is a technical object of the present invention to prevent that the solid fuel particles obtained by pulverizing biomass fuel are adhered to and deposited on an inside of a nozzle.

Solution to Problem

In order to solve the above technical object, there is provided a solid fuel burner according to a first aspect of the present invention, including: a fuel nozzle through which a mixed fluid of solid fuel and a carrier gas thereof flows, and is opened toward a furnace; a combustion gas nozzle which is disposed on an outer peripheral side of the fuel nozzle to spray a combustion gas; a venturi provided in the fuel nozzle, in which a flow passage of the mixed fluid in the fuel nozzle is narrowed toward a center in a flow passage cross section; a fuel concentrator which is provided on the center side of the fuel nozzle to impart a velocity component to the mixed fluid in a direction away from the center of the fuel nozzle; and a flow passage partition member configured to partition the flow passage of the fuel nozzle into an inner side and an outer side in the flow passage cross section, wherein the flow passage partition member has a shape in which a cross-sectional area of an outer flow passage is enlarged toward a downstream end rather than an upstream end, the venturi at least has a contraction part in which a cross-sectional area of the flow passage of the mixed fluid is decreased toward the downstream side, and an expansion part disposed on the downstream side of the contraction part, in which the cross-sectional area of the flow passage of the mixed fluid is increased toward the downstream side, and an upstream end of the fuel concentrator is provided between an upstream end and a downstream end of the expansion part of the venturi, the fuel nozzle has an internal surface formed in a straight pipe shape from the downstream end of the expansion part to an opening portion of the venturi on the furnace side, and an inner diameter of the opening portion of the fuel nozzle on the furnace side is larger than an inner diameter of the upstream end of the venturi in the downstream end of the expansion part of the venturi.

A second aspect of the present invention is the solid fuel burner according to the first aspect, wherein a distance between a downstream end portion of the flow passage partition member and an opening end portion of the solid fuel burner on the furnace side in a flow direction of the mixed fluid is set in a range of ½ to 2 times an inner diameter of the fuel nozzle.

A third aspect of the present invention is the solid fuel burner according to the first aspect, including the flow passage partition member which is supported by a support member from an inner wall side of the fuel nozzle.

A fourth aspect of the present invention is the solid fuel burner according to the third aspect, wherein the support member is disposed so that a plurality of plate-shaped members are disposed so as to be linear when viewed from an opening face side of the fuel nozzle.

A fifth aspect of the present invention is the solid fuel burner according to the third aspect, wherein the support member is formed to have a large width so that a flow passage width in a circumferential direction of the fuel nozzle is narrowed toward the downstream side, and after reaching a maximum width, is formed to have a small width so that the flow passage width is gradually enlarged toward the downstream side.

In order to solve the above technical object, there is provided a combustion device according to a sixth aspect of the present invention including a plurality of stages in a vertical direction of a side wall surface of the furnace, and a plurality of burners provided in each stage in the furnace width direction, the combustion device including: at least one solid fuel burner according to the first aspect of the present invention.

A seventh aspect of the present invention is the combustion device according to the sixth aspect, including one or more of the solid fuel burners according to the first aspect of the present invention at least in an uppermost stage.

An eighth aspect of the present invention is the solid fuel burner according to the first aspect, wherein the cross-sectional area of the flow passage of the mixed fluid is formed so as to be monotonously increased or be the same as each other from the upstream end of the expansion part to the opening portion of the venturi on the furnace side.

Advantageous Effects

According to the first and sixth aspects of the present invention, the flow passage partition member has a shape in which the cross-sectional area of the outer flow passage expands toward the downstream end rather than the upstream end, and the upstream end of the fuel concentrator is provided between the upstream end and the downstream end of the expansion part of the venturi, such that increasing or decreasing the flow rate of the mixed fluid so as to pulsate is reduced. In addition, an occurrence of a low flow rate region in which fuel particles may be adhered, deposited and remain therein is prevented, and the flow rate is smoothly reduced. Thereby, it is possible to prevent the solid fuel particles obtained by pulverizing the biomass fuel from being adhered to and deposited on the inside of the nozzle. In addition, according to the first and sixth aspects of the present invention, an inner diameter (D1) of the opening portion of the fuel nozzle on the furnace side is larger than an inner diameter (D2) of the upstream end of the venturi (D1>D2) in the downstream end (V4) of the diameter expansion part (33c) of the venturi (33), such that the flow rate of the mixed fluid in the opening portion of the fuel nozzle is decreased, as well as ignitability and flame holding properties are improved.

According to the second aspect of the present invention, in addition to the effect of the first aspect of the present invention, as compared to a case in which the distance between the downstream end portion of the flow passage partition member and the opening end portion of the solid fuel burner on the furnace side is less than ½ times of the inner diameter of the fuel nozzle, damage caused by radiation from the furnace is reduced. In addition, as compared to a case in which the distance between the downstream end portion of the flow passage partition member and the opening end portion of the solid fuel burner on the furnace side is larger than two times the inner diameter of the fuel nozzle, it is possible to prevent the solid fuel burner from being large sized and long sized.

According to the third aspect of the present invention, in addition to the effect of the first or second aspect of the present invention, as compared to a case in which the flow passage partition member is not supported by the support member from the inner wall side of the fuel nozzle (for example, a case of being supported by an oil gun), when inserting and removing the oil gun into or from the fuel nozzle in the axial direction, for example, for maintenance of the solid fuel burner, it is possible to easily perform operations of assembly and disassembly of the solid fuel burner, without hindrance of the flow passage partition member.

According to the fourth aspect of the present invention, in addition to the effect of the third aspect of the present invention, it is possible to prevent the support member from hindering the flow of the mixed fluid. In addition, when viewed from the opening face side of the fuel nozzle, compared to a case in which a plurality of plate-shaped members are not disposed so as to be linear, a generation of vortex flow is prevented, as well as adhesion of the fuel to the support member and damage of each member due to ignition of the adhered fuel are reduced.

According to the fifth aspect of the present invention, in addition to the effect of the third aspect of the present invention, it is possible to prevent the support member from hindering the flow of the mixed fluid. In addition, the fuel may be condensed in the circumferential direction at a site where the width is formed large. Further, as compared to a case in which there is no portion of downstream side where the width becomes small, the generation of vortex flow is prevented, as well as adhesion of the fuel to the support member and damage of each member due to ignition of the adhered fuel are reduced.

According to the seventh aspect of the present invention, in addition to the effect of the sixth aspect of the present invention, it is possible to prevent the biomass fuel from falling to the furnace bottom of the furnace in an unignited state.

According to the eighth aspect of the present invention, in addition to the effect of the first aspect of the present invention, as compared to a case in which the cross-sectional area of the flow passage of the mixed fluid is monotonously decreased from the upstream end of the expansion part to the opening portion of the venturi on the furnace side, ignitability and flame holding properties are improved, as well as adhesion and deposition of fuel particles having a large particle size such as biomass fuel in the fuel nozzle are inhibited, and combustibility is improved.

BRIEF DESCRIPTION OF DRAWINGS

FIGS. 5(A) through 5(C) are views describing another example of the embodiment of the present invention, wherein

5(B) is a view corresponding to FIG. 3.

FIGS. 6(A) through 6(E) are views describing a boiler (combustion device) including the solid fuel burner of the present invention, wherein

DESCRIPTION OF EMBODIMENTS

Next, specific examples of an embodiment of the present invention (hereinafter referred to as embodiments) will be described with reference to the drawings, but the present invention is not limited to the following embodiments. Further, in the following description using the drawings, members other than members necessary for the description to facilitate the understanding will not be appropriately illustrated and described.

Embodiment 1

Figure 1:
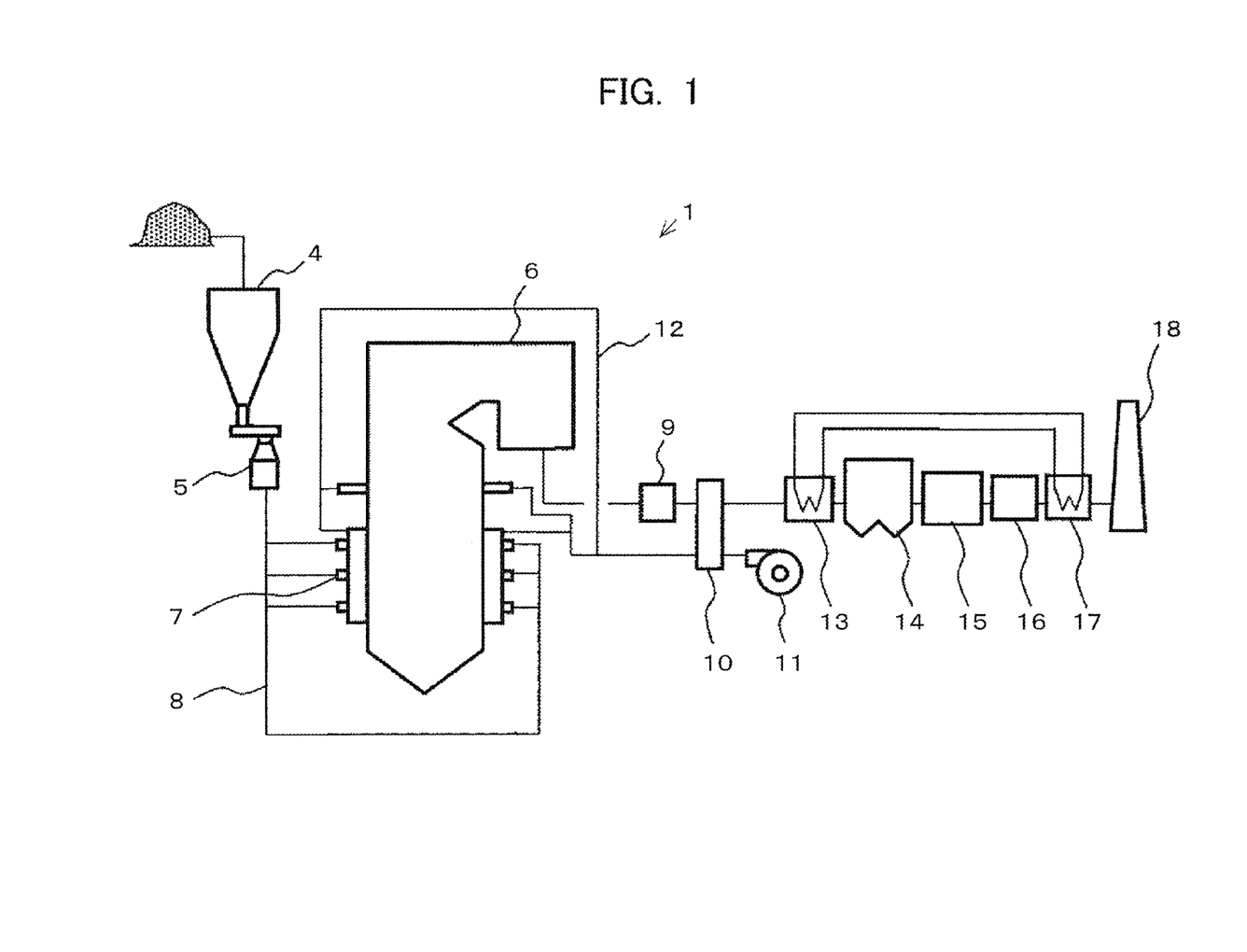
FIG. 1 is an entire view describing a combustion system according to Embodiment 1 of the present invention.

FIG. 1 is an entire view describing a combustion system according to Embodiment 1 of the present invention.

Referring to FIG. 1, in a combustion system (combustion device) 1 of Embodiment 1 used in a thermal power generation plant, and the like, biomass fuel (solid fuel) is housed in a bunker (fuel hopper) 4. The biomass fuel of the bunker 4 is pulverized by a mill (crusher) 5. The pulverized fuel is supplied to a solid fuel burner 7 of a boiler (furnace) 6 through a fuel pipe 8 and burned. Further, a plurality of solid fuel burners 7 are installed in the boiler 6.

An exhaust gas discharged from the boiler 6 is denitrated by a denitration device 9. The denitrated exhaust gas passes through an air preheater 10. In the air preheater 10, heat exchange between an air sent from a blower 11 and the exhaust gas is performed. Therefore, the exhaust gas is cooled, and the air from the blower 11 is heated. The air from the blower 11 is supplied to the solid fuel burner 7 and the boiler 6 as a combustion air through an air pipe 12.

When the exhaust gas that has passed through the air preheater 10 passes through a gas-gas heater (heat recovery device) 13, heat is recovered and the exhaust gas is cooled.

The exhaust gas that has passed through the gas-gas heater (heat recovery device) 13 passes through a dry dust collector 14, thereby dust in the exhaust gas is recovered and removed.

The exhaust gas that has passed through the dry dust collector 14 is sent to the desulfurization device 15 to be desulfurized therein.

The exhaust gas that has passed through the desulfurization device 15 passes through a wet dust collector 16 while dust in the exhaust gas is recovered and removed again.

The exhaust gas that has passed through the wet dust collector 16 is reheated by a gas-gas heater (reheating device) 17.

The exhaust gas that has passed through the gas-gas heater (reheating device) 17 is discharged to the atmosphere from a chimney 18.

Further, a configuration of the mill 5 itself may use various conventionally known configurations. For example, such a configuration is described in Japanese Patent Laid-Open Publication No. 2010-242999, and therefore will not be described in detail.

Figure 2:
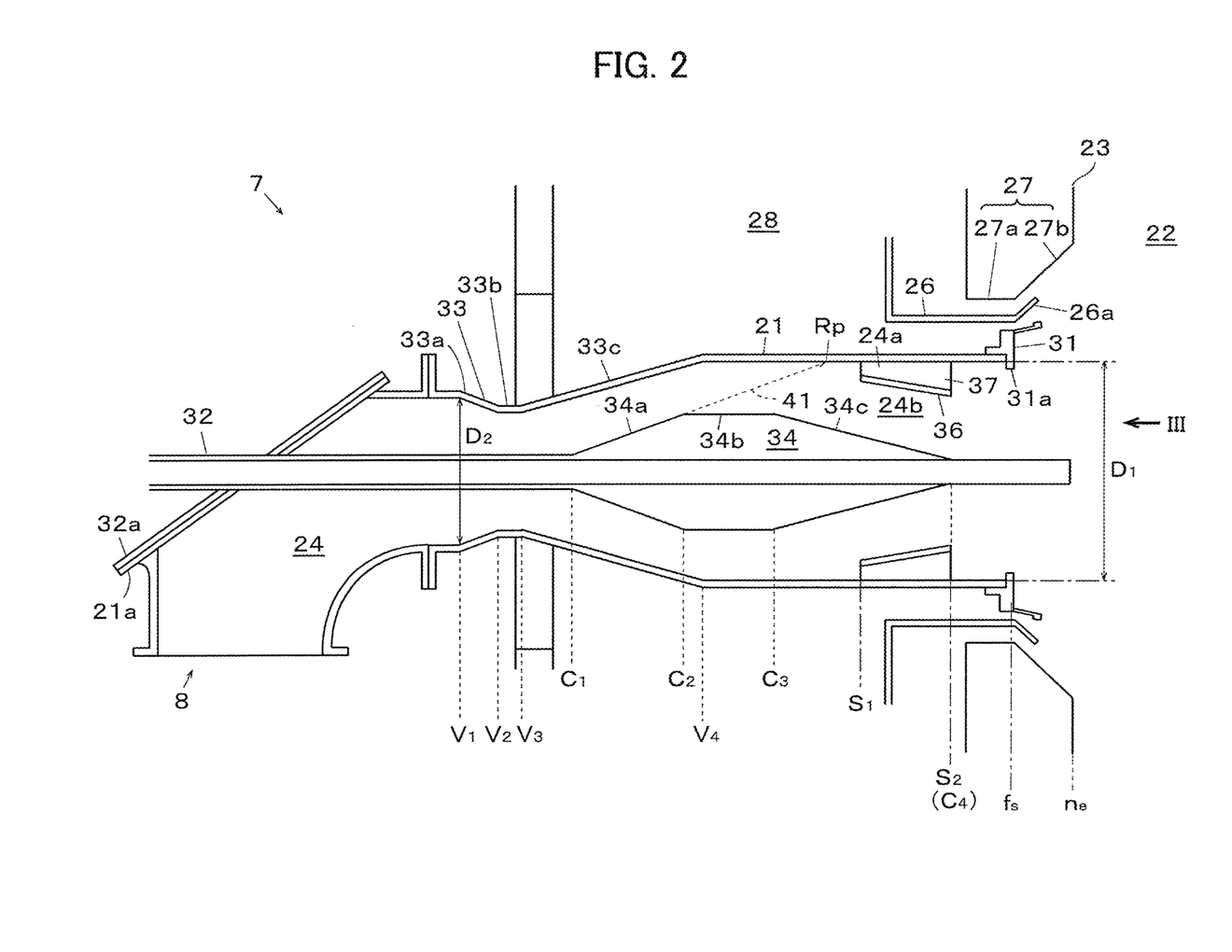
FIG. 2 is a view describing a solid fuel burner of Embodiment 1.

FIG. 2 is a view describing the solid fuel burner of Embodiment 1.

Figure 3:
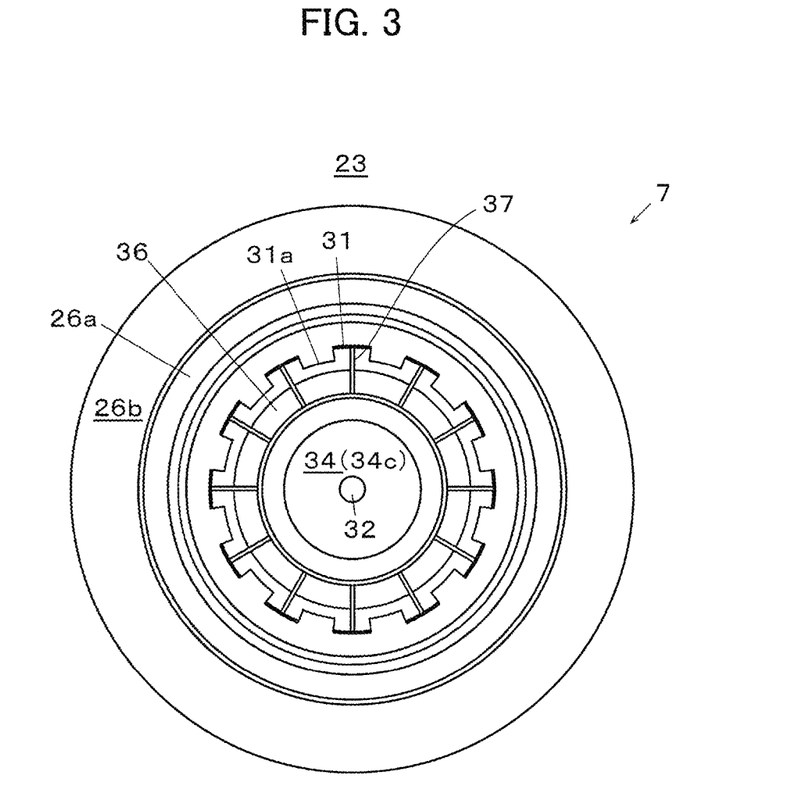
FIG. 3 is a view as seen from an arrow III direction in FIG. 2.

FIG. 3 is a view as seen from an arrow III direction in FIG. 2.

In FIGS. 2 and 3, the solid fuel burner 7 of Embodiment 1 has a fuel nozzle 21 through which a carrier gas flows. An opening at a downstream end of the fuel nozzle 21 is provided in a wall surface (furnace wall, water pipe wall) 23 of a furnace 22 of the boiler 6. The fuel nozzle 21 is connected with the fuel pipe 8 at an upstream end thereof. The fuel nozzle 21 is formed in a hollow cylindrical shape, and a flow passage 24 is formed inside the fuel nozzle 21, through which a solid fuel (crushed biomass fuel) and the carrier gas flow.

An inner combustion gas nozzle (secondary combustion gas nozzle) 26 is installed on an outer periphery of the fuel nozzle 21 to spray a combustion air to the furnace 22. In addition, an outer combustion gas nozzle (tertiary combustion gas nozzle) 27 is installed on an outer peripheral side of the inner combustion gas nozzle 26. Each of the combustion gas nozzles 26 and 27 sprays air from a wind box (wind case) 28 toward an inside of the furnace 22. In Embodiment 1, a guide vane 26a is formed at the downstream end of the inner combustion gas nozzle 26, which is inclined radially outward with respect to a center of the fuel nozzle 21 (a diameter thereof is increased toward the downstream side). In addition, a throat part 27a along an axial direction and an expansion part 27b parallel to the guide vane 26a are formed in the downstream portion of the outer combustion gas nozzle 27. Therefore, the combustion air sprayed from the respective combustion gas nozzles 26 and 27 is sprayed so as to be diffused from the center in the axial direction.

Further, a flame holder 31 is supported on an opening portion at the downstream end of the fuel nozzle 21. In FIGS. 2 and 3, the flame holder 31 has inner peripheral side protrusions 31a formed therein. The inner peripheral side protrusions 31a are formed to protrude toward the center side of the fuel nozzle 21, and the inner peripheral side protrusions 31a are periodically disposed at an interval along a circumferential direction (see FIG. 3).

In FIGS. 2 and 3, an ignition burner (oil gun) 32 is formed to penetrate a flow passage cross section of the fuel nozzle 21 at the central portion thereof. The ignition burner 32 is supported in a state of penetrating a collision plate 32a supported by a collision plate flange 21a of the fuel nozzle 21.

In FIG. 2, a venturi 33 is formed in an inner wall surface of the fuel nozzle 21. The venturi 33 has a diameter contraction part 33a on the upstream side, a minimum diameter part 33b which is continued to the downstream side of the diameter contraction part 33a, and a diameter expansion part 33c which is continued to the downstream side of the minimum diameter part 33b. The diameter contraction part 33a is formed to be inclined with respect to the inner wall surface of the fuel nozzle 21 toward the downstream side to a radial center side of the flow passage cross section. Therefore, an inner diameter of the flow passage 24 is reduced toward a downstream end V2 from an upstream end V1 of the diameter contraction part 33a. In addition, the minimum diameter part 33b is formed in parallel to the axial direction of the fuel nozzle 21. The diameter expansion part 33c is formed to be inclined radially outward toward the downstream side. Therefore, the inner diameter of the flow passage 24 is increased toward a downstream end V4 from an upstream end V3 of the diameter expansion part 33c.

Therefore, in the venturi 33 of Embodiment 1, the mixed fluid of the fuel and the carrier gas supplied to the fuel nozzle 21 is narrowed inward in a radial direction when passing through the diameter contraction part 33a. Therefore, it is possible to move the fuel biased in the vicinity of the inner wall surface of the fuel nozzle 21 to the center side.

A fuel concentrator 34 is installed on an outer surface of the ignition burner 32 on the downstream side of the venturi 33. The fuel concentrator 34 has a diameter expansion part 34a on the upstream side, a maximum diameter portion 34b which is continued to the downstream side of the diameter expansion part 34a, and a diameter contraction part 34c which is continued to the downstream side of the maximum diameter portion 34b. The diameter expansion part 34a is formed to be inclined radially outward of the flow passage cross section with respect to the outer surface of the ignition burner 32 toward the downstream side. Therefore, an outer diameter of the diameter expansion part 34a is increased toward a downstream end C2 from an upstream end C1 of the diameter expansion part 34a. The maximum diameter portion 34b is formed in parallel to the axial direction of the fuel nozzle 21. The diameter contraction part 34c is formed to be inclined toward the downstream side to the radial center side. Therefore, an outer diameter of the diameter contraction part 34c is decreased toward a downstream end C4 from an upstream end C3 of the diameter contraction part 34c.

Therefore, in the fuel concentrator 34 of Embodiment 1, a velocity component toward the outer side in the radial direction is imparted to the mixed fluid of the fuel and the carrier gas when passing through the diameter expansion part 34a. Thereby, the fuel is condensed toward the inner wall surface of the fuel nozzle 21.

Figure 4A:
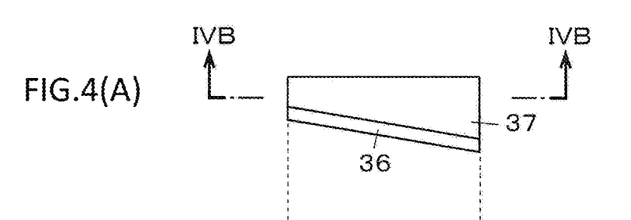
FIGS. 4(A) and 4(B) are views describing a flow passage partition member of Embodiment 1, wherein FIG. 4 (A) is a side view, and FIG. 4 (B) is a cross-sectional view taken on line IVB-IVB in FIG. 4 (A).
Figure 4B:
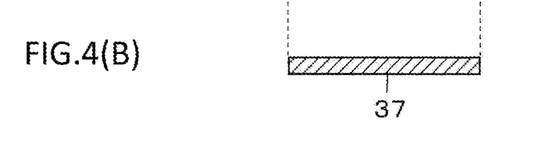

FIGS. 4(A) and 4(B) are views describing a flow passage partition member of Embodiment 1, wherein FIG. 4 (A) is a side view, and FIG. 4 (B) is a cross-sectional view taken on line IVB-IVB in FIG. 4 (A).

In FIGS. 2 and 3, a flow passage partition member 36 is disposed on the downstream side of the fuel concentrator 34. The flow passage partition member 36 is supported on an inner surface of the fuel nozzle 21 by support members 37. The flow passage partition member 36 of Embodiment 1 is formed in a partial cone shape (conical shape) whose inner diameter is reduced toward a downstream end S2 from an upstream end S1. Therefore, the flow passage partition member 36 partitions the flow passage 24 into an outer flow passage 24a and an inner flow passage 24b.

In FIGS. 3, 4(A) and 4(B), the support member 37 is formed in a plate shape extending in the radial direction. A plurality of support members 37 are disposed at an interval in the circumferential direction. In FIG. 3, according to Embodiment 1, the support members 37 are disposed between the inner peripheral side protrusions 31a of the flame holder 31 at positions corresponding thereto.

As shown in FIG. 2, in the solid fuel burner 7 of Embodiment 1, the upstream end S1 of the flow passage partition member 36 is set at the downstream side from a position Rp in which an extension line 41 of the diameter expansion part 34a of the fuel concentrator 34 reaches the inner wall of the fuel nozzle 21. Therefore, most of the fuel condensed toward an inner peripheral wall of the fuel nozzle 21 by the diameter expansion part 34a of the fuel concentrator 34 is supplied to the outer flow passage 24a. Thereby, the flow passage partition member 36 hardly hinders the flow of particles directed radially outward by the fuel concentrator 34, and the fuel directed radially outward in the outer flow passage 24a is reflected by the inner peripheral wall, such that even if it goes to a central axis side again, the fuel is blocked by the flow passage partition member 36. Thereby, the fuel condensed in the fuel concentrator 34 is prevented from being uniformly redispersed in the flow passage cross section.

Further, in Embodiment 1, the speed of the mixed fluid in a central axis direction of the fuel nozzle 21 is decreased at the downstream side from the downstream end C2 of the diameter expansion part 34a of the fuel concentrator 34. Therefore, it is considered that the fuel particles reach the inner peripheral wall of the nozzle at a slightly upstream side from the position Rp. Therefore, it is desirable that the upstream end S1 of the flow passage partition member 36 is set on the downstream side from the position Rp, but it is not limited thereto, and the upstream end may also be set at the same position as the position Rp or at the slightly upstream side.

However, if the position of the upstream end S1 of the flow passage partition member 36 is set too much on the upstream side, the fuel particles flowing toward the outside in the radial direction are hindered. Thereby, in Embodiment 1, the upstream end S1 of the flow passage partition member 36 is set in a region which does not overlap with a flow line (the extension line 41) of the fuel particles that flow toward the downstream side from the downstream end portion C3 of the maximum diameter portion 34b of the fuel concentrator 34, that is, toward the outside in the radial direction.

If the position of the upstream end S1 of the flow passage partition member 36 is too far on the downstream side with respect to the position Rp, there is a problem that the fuel particles are condensed on the inner peripheral wall side of the fuel nozzle 21 by the fuel concentrator 34, and then in the mixed fluid having a concentration distribution in which the fuel concentration is increased toward the outside in the radial direction from the central axis side of the fuel nozzle 21, the concentration distribution is diminished due to the fuel particles which are reflected by the inner wall and again directed toward the central axis side of the nozzle.

Further, for example, when a flowing stream of the mixed fluid is on the downstream side from the downstream end C4 of the diameter contraction part 34c of the fuel concentrator 34 where the flow rate is lowered in the entire cross section in the fuel nozzle 21, the flow rate of the mixed fluid in the outer flow passage 24a of the flow passage partition member 36 is further reduced in a region from the upstream end S1 to the downstream end S2. As a result, the flow rate is too lowered, and possibilities of adhesion and deposition of the fuel particles are increased.

Furthermore, the flow passage partition member 36 needs a certain length in order to exhibit an original function thereof. Therefore, when securing the length of the flow passage partition member 36, the position of the downstream end S2 is close to an opening end (a burner longitudinal position) fs of the fuel nozzle 21 or a burner opening face (opening end position) ne. Herein, if the upstream end S1 of the flow passage partition member 36 is disposed too far on the downstream side with respect to the position Rp, there is a problem that overall axial lengths of the fuel nozzle 21 and the solid fuel burner 7 are increased. This leads to increased size (length) of the solid fuel burner 7 and increased costs, as well as there may be interferences with other equipment and outdoor structures of the furnace, and restrictions on installation places, therefore it is not desirable.

Accordingly, in Embodiment 1, the upstream end S1 of the flow passage partition member 36 is set at least on the upstream side from the downstream end C4 of the diameter contraction part 34c of the fuel concentrator 34.

Further, the flow passage partition member 36 of Embodiment 1 is formed in a conical shape in which a cross-sectional area of the outer flow passage 24a in the downstream end S2 is larger than the cross-sectional area of the outer flow passage 24a in the upstream end S1, so that the flow rate of the mixed fluid at the downstream end S2 is lower than the flow rate thereof at the upstream end S1. When having the above-described inclined shape, the solid fuel particles are more likely to move along an inclined surface and are less likely to be deposited on an upper surface than a case of a cylindrical shape along the axial direction.

Furthermore, the flow passage partition member 36 of Embodiment 1 is supported by the support members 37 from the inner peripheral wall side of the fuel nozzle 21. If the flow passage partition member 36 is supported from the central axis (ignition burner 32) side, when separating the ignition burner 32 and/or the fuel concentrator 34 from the collision plate flange 21a together with the collision plate 32a and pulling them out of the furnace during maintenance and inspection thereof, if the flow passage partition member 36 and the support member 37 are not separated from each other, these members cannot pass through the venturi 33. That is, there is a problem that ease of maintenance inspection work is deteriorated. On the other hand, in Embodiment 1, the flow passage partition member 36 is supported from the inner peripheral wall side of the fuel nozzle 21, such that the ignition burner 32 and/or the fuel concentrator 34 may be easily maintained and inspected.

Further, in Embodiment 1, the flow passage partition member 36 and the support member 37 (and the fuel concentrator 34) are installed on the upstream side in a fluid flow direction in the fuel nozzle 21, that is, an outside of the furnace 22 at a distance from the opening end portion fs of the fuel nozzle 21 on the furnace 22 side or an opening portion ne formed in a wall surface of the furnace 22 of the solid fuel burner 7. More specifically, as shown in FIG. 2, the position of the downstream end S2 of the flow passage partition member 36 is set at a position separated from the opening end portion fs of the fuel nozzle 21 on the furnace side by ¼ or more of an inner diameter D1 in the opening end portion fs of the fuel nozzle 21 on the furnace side, or from the opening portion ne in a furnace wall surface of the solid fuel burner 7 by ½ or more of the inner diameter D1.

Therefore, it is reduced that the flow passage partition member 36, and the like reaches a high temperature due to radiation received from the furnace (inside the furnace) 22, and is easily directly damaged by heat. Further, it is possible to reduce a risk of ignition even when the fuel particles are adhered to and deposited on the upper surface of the flow passage partition member 36, etc., or a risk of ignition in the fuel nozzle 21 due to a remaining tendency even without adhesion and deposition, and it is also possible to easily make an ignition region be on the downstream side of the flame holder 31.

In addition, if the downstream end S2 of the flow passage partition member 36 is too far separated from the respective positions fs and ne, a section after the flow rate reduction in the flow passage partition member 36 is increased. If increasing the section after the flow rate reduction, there are problems that the possibilities in which the fuel particles are adhered to and deposited on the wall surface of the fuel nozzle 21 are increased, or the fuel nozzle 21 becomes longer to increase the size of the solid fuel burner 7. Therefore, in practice, it is desirable that a distance from the position ne to the downstream end S2 of the flow passage partition member 36 is about two times the inner diameter D1.

Further, in Embodiment 1, the upstream end C1 of the fuel concentrator 34 is set to the diameter expansion part 33c (between V3 and V4) of the venturi 33. In particular, the downstream end C2 of the diameter expansion part 34a of the fuel concentrator 34 is disposed on the upstream side from the downstream end V4 of the diameter expansion part 33c of the venturi 33.

Herein, when observing a flow rate F of the mixed fluid from the upstream side, first, the flow rate which was F0 at the upstream end V1 of the venturi 33 is gradually accelerated by the diameter contraction part 33a, and is fastest at the minimum diameter part 33b, and then is gradually decelerated as the axial cross-sectional area of the fuel nozzle 21 is increased in the diameter expansion part 33c.

The degree of increase in the axial cross-sectional area of the fuel nozzle 21 is reduced from the upstream end C1 of the fuel concentrator 34 to the downstream end C2 of the diameter expansion part 34a, but the flow rate is reduced.

In addition, in Embodiment 1, the axial cross-sectional area in the downstream end C2 of the diameter expansion part 34a of the fuel concentrator 34 is set so as to be increased to about two times the axial cross-sectional area in the upstream end V3 of the diameter expansion part 33c of the venturi.

Herein, if the downstream end C2 of the diameter expansion part 34a of the fuel concentrator 34 is set to be the same position as the downstream end V4 of the venturi 33 or on the upstream side thereof, the flow rate F tends to be continuously decelerated from the positions V3 to V4, and is not changed to acceleration. In addition, the flow rate F is constant from the downstream end V4 of the venturi 33 to the downstream end C3 of the maximum diameter portion 34b of the fuel concentrator 34, and as the outer diameter of the diameter contraction part 34c is decreased after the downstream end C3, the flow rate F is further decelerated.

If the upstream end C1 of the fuel concentrator 34 is set on the downstream side from the downstream end V4 of the venturi 33 (in the case of Patent Document 1), the flow rate F which is decelerated to the downstream end V4 of the venturi 33 is changed to acceleration from the upstream end C1 to the downstream end C2 of the diameter expansion part 34a of the fuel concentrator 34. When making a flow passage cross-sectional area have a profile in which the fuel particles that have been once decelerated at the diameter expansion part 33c of the venturi 33 are accelerated again, that is, a flow such as pulsating flow is formed (a change in flow passage cross-sectional area toward the downstream side from the upstream side), a region in which the flow rate F is too reduced may occur, and the fuel particles may be deposited and remain. Also in terms of design values, in a case in which the fuel concentrator 34 does not exist on the central axis side of the fuel nozzle 21 in the downstream end V4 of the venturi 33, the flow rate F is too lowered, and it becomes a region in which the fuel particles may be deposited and remain.

On the other hand, in Embodiment 1, the upstream end C1 of the fuel concentrator 34 is set to the diameter expansion part 33c (between V3 and V4) of the venturi 33. Therefore, a flow such as pulsating flow does not occur from the upstream end V3 of the diameter expansion part 33c of the venturi 33 to the upstream end S1 of the flow passage partition member 36, and the flow rate F is smoothly decelerated without falling into a low flow rate region in which the fuel particles may be deposited and remain. Thereby, in the solid fuel burner 7 of Embodiment 1, the cross-sectional areas are set so as to be monotonously increased or be the same as each other (not decreased) inside of the fuel nozzle 21, so that the flow rates F are not increased (are monotonously increased or are the same as each other) toward the downstream end (opening portions fs and ne) from the upstream end V3 of the diameter expansion part 33c of the venturi 33.

In FIGS. 2 to 4(B), the support member 37 of Embodiment 1 is formed in a radial plate shape extending in the radial direction, and has a form that does not hinder the flow of the mixed fluid as much as possible. Further, in Embodiment 1, the support member 37 uses one plate-shaped member whose longitudinal length is the same as that of the flow passage partition member 36, but it is not limited thereto, and even if the plate is divided into a plurality of portions, it is also possible to make the member in a rod shape.

Herein, Patent Document 1 discloses an example in which an obstacle (14) has a wedge-shaped three-dimensional structure with respect to the flow of the mixed fluid. As in the configuration described in Patent Document 1, if it is a form in which, immediately after a flow passage in a circumferential direction is narrowest with respect to the flow direction of the mixed fluid, a flow passage is connected to a space where the obstacle (14) is broken, then expands at once, a vortex flow, in which the mixed fluid flows backward toward a wall surface facing the opening portion of the obstruction (14) to the furnace and the space, is generated. Since the planar portion reaches a high temperature due to radiation received from the furnace, it is necessary to consider measures such as a use and covering of a member having high heat resistance. There are possibilities in which the fuel particles are adhered and grown, or remain due to the generation of the above-described vortex flow.

On the other hand, in Embodiment 1, the support member 37 is formed in a plate shape whose thickness direction faces the furnace 22, and when viewed from the opening face side of the fuel nozzle 21, a plurality of plate-shaped support members 37 are disposed so as to be linear. Thereby, as compared to the configuration described in Patent Document 1, the vortex flow in which the mixed fluid flows backward is less likely to occur, and it is possible to prevent the fuel particles from being adhered and grown, or remaining. In addition, it is economical since it requires less measures against the high temperature due to radiation received from the furnace 22.

In addition, the support member 37 of Embodiment 1 is disposed at the position which does not overlap with the inner peripheral side protrusions 31a of the flame holder 31, and as compared to the case of being overlapped, the resistance of the flow of the mixed gas is reduced.

Further, in Embodiment 1, in relation to the inner diameter of the fuel nozzle (primary nozzle) 21, the inner diameter D1 (excluding the inner peripheral side protrusions 31a of the flame holder 31) in the opening portion (downstream end) is set to be larger than an inner diameter D2 in the upstream end V1 of the venturi 33. In order to prevent the fuel particles from being adhered to and deposited on the inside of the flow passage on the upstream side (a fuel transferring pipe) of the fuel nozzle 21, it is necessary to maintain the flow rate of the mixed fluid to be high to some extent, whereas it is necessary to sufficiently reduce the flow rate in the opening portion of the fuel nozzle (primary nozzle) 21 from the viewpoint of ignitability and flame holding properties. Thereby, in Embodiment 1, the inner diameter D1 in the downstream end is set to be larger than the inner diameter D2 in the upstream end V1 of the venturi 33.

Figure 5A:
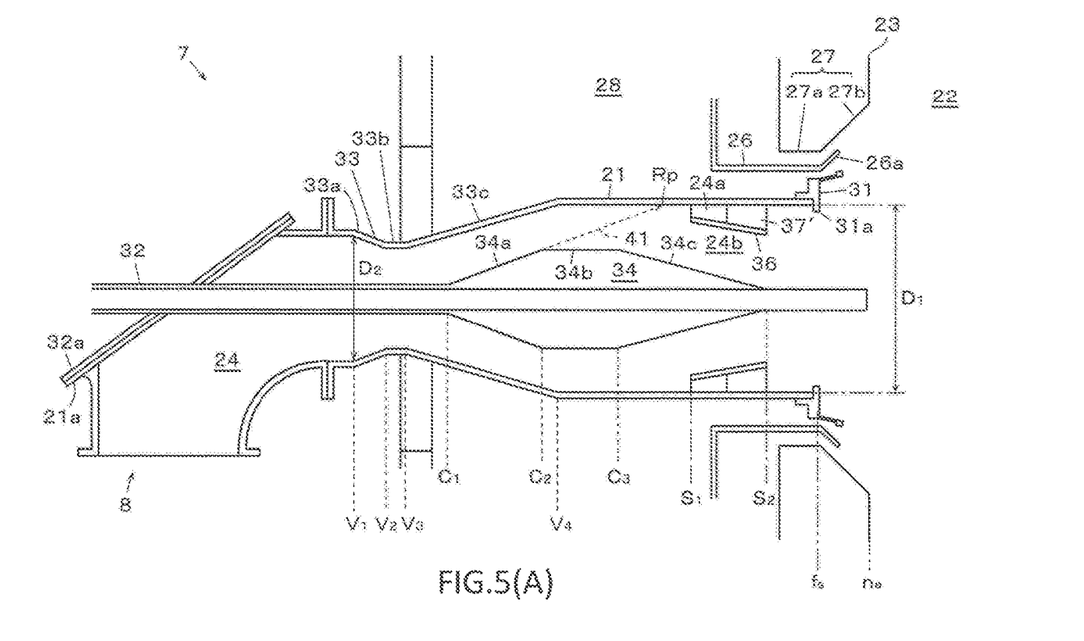
FIG. 5(A) is a view corresponding to FIG. 2, FIG.
Figure 5B:
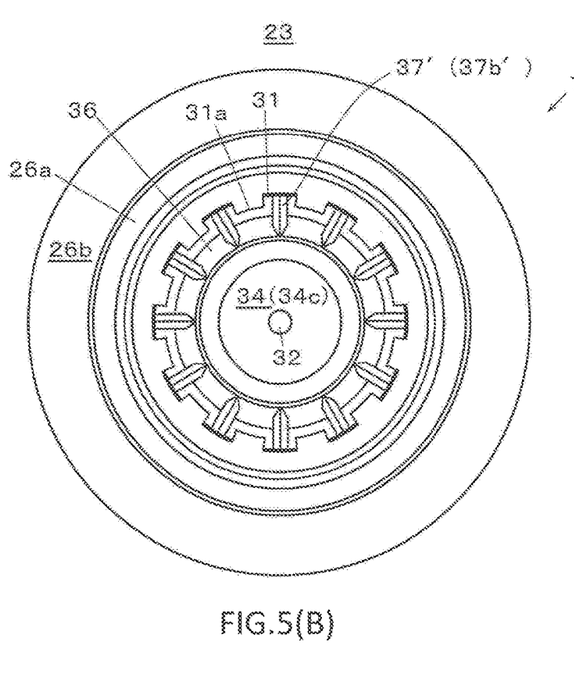
Figure 5C:
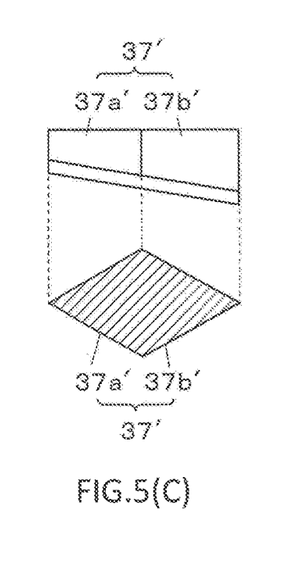
FIG. 5(C) is a view corresponding to FIG. 4.

FIGS. 5(A) through 5(C) are views describing another example of the embodiment of the present invention, wherein FIG. 5(A) is a view corresponding to FIG. 2, FIG. 5(B) is a view corresponding to FIG. 3, and FIG. 5(C) is a view corresponding to FIGS. 4(A) and (B).

In place of the form of the support member 37 shown in FIGS. 2 to 4(B), the support member 37' shown in FIGS. 5(A) through 5(C) has an upstream portion 37a' of which a width of the support member 37' is formed larger so that a flow passage width in the circumferential direction of the fuel nozzle 21 is gradually narrowed toward the downstream side, and a downstream portion 37b' of which a width of the support member 37' is formed smaller so that the flow passage width reaches the maximum width (position Sm), and then is gradually increased toward the downstream side. Therefore, as shown in FIG. 5(C), the support member 37' has a radial cross section formed in a diamond shape, but it is not limited thereto, and it is possible to make a form such as a streamline shape, or the like with respect to the mixed fluid flowing in the fuel nozzle 21.

Further, it is not necessary for the width of the above-described maximum width portion to be constant in the nozzle radial direction, and the cross-sectional shape of the support member 37' may be formed in a substantially trapezoidal shape when viewed from the nozzle opening.

In the support member 37' of the embodiment shown in FIGS. 5(A) through 5(C), the fuel concentration function in the circumferential direction of the fuel nozzle 21 is improved as compared to the case shown in FIGS. 2 to 4(B), and since it has the downstream portion 37b' whose flow passage width is gradually decreased, the vortex flow hardly occurs and adhesion, growth, or remaining of the fuel particles is inhibited unlike Patent Document 1.

Figure 6A:
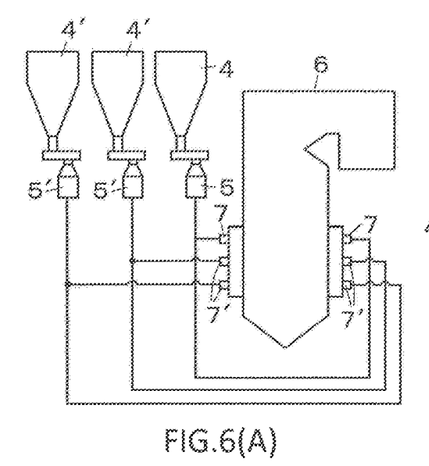
FIG. 6(A) is a view describing a case of including the solid fuel burner of the present invention, in which biomass fuels are used at the uppermost stages on a front side of a can (boiler) and a rear side of the can among front and rear respective three-stage solid fuel burners of the can, FIGS. 6(B) and 6(D) views describing a case of including the solid fuel burner of the present invention, in which the biomass fuel is used at the uppermost stage on the front side of the can.
Figure 6B:
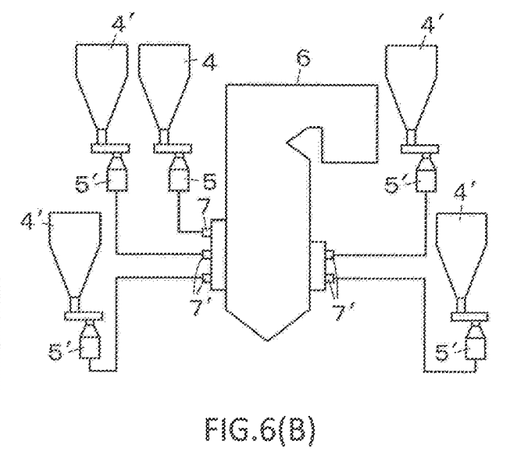
Figure 6C:
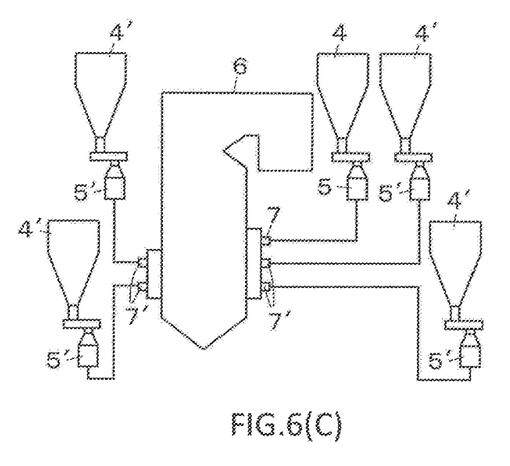
FIGS. 6(C) and 6(E) are views describing a case of including the solid fuel burner of the present invention, in which the biomass fuel is used at the uppermost stage on the rear side of the can.
Figure 6D:
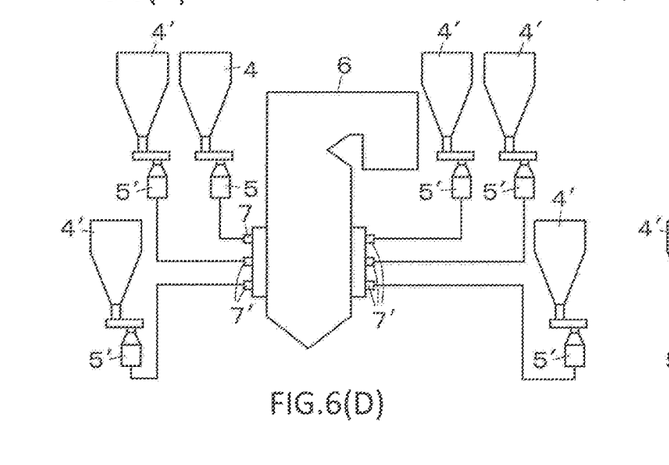
Figure 6E:
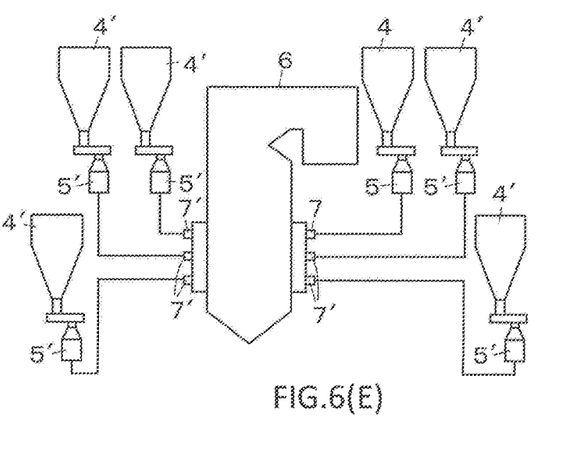

FIGS. 6(A) through 6(E) are views describing a boiler (combustion device) including the solid fuel burner of the present invention, wherein FIG. 6(A) is a view describing a case of including the solid fuel burner of the present invention, in which biomass fuels are used at the uppermost stages on a front side of a can (boiler) and a rear side of the can among front and rear respective three-stage solid fuel burners of the can, FIGS. 6(B) and 6(D) are views describing a case of including the solid fuel burner of the present invention, in which the biomass fuel is used at the uppermost stage on the front side of the can, and FIGS. 6(C) and 6(E) are views describing a case of including the solid fuel burner of the present invention, in which the biomass fuel is used at the uppermost stage on the rear side of the can.

In the embodiment shown in FIG. 6(A), biomass fuel is supplied to a solid fuel burner 7 of the uppermost stage among the solid fuel burners 7. Meanwhile, coal as an example of the solid fuel is supplied to solid fuel burners 7' of middle and lower stages. The coal contained in a bunker 4' is pulverized by a mill 5' to be the pulverized coal, and is supplied to the solid fuel burners 7' of the middle and lower stages. In each stage, a plurality of solid fuel burners 7 are installed in a furnace width direction of a combustion device 1.

The embodiment of the solid fuel burner 7' may not necessarily be the solid fuel burner of the above-described present invention.

As shown in FIG. 1, when using biomass fuel, the biomass fuel having a large particle size may fall to the furnace bottom in an unignited state. If the unignited biomass fuel is deposited on the furnace bottom, there is a problem that the frequency of maintenance should be increased, or waste of fuel is increased.

On the other hand, in the embodiment shown in FIG. 6(A), the biomass fuel is used only in the solid fuel burner 7 of the uppermost stage. Therefore, even if the unignited biomass fuel is generated in the uppermost solid fuel burner 7, the unignited biomass fuel may be ignited and be easily burned out by the solid fuel burners 7' of the middle and lower stages until the fuel falls to the furnace bottom. In particular, in the boiler 6, the temperature tends to be increased toward the upper side in a region in which the solid fuel burners 7 and 7' are installed. Therefore, if using the biomass fuel in the solid fuel burner 7 of the uppermost stage, it is less likely for there to be unignited biomass fuel than the case of using the biomass fuel in the solid fuel burner of the lower stage. Thereby, in the embodiment shown in FIG. 6(A), it is difficult for the unignited biomass fuel to fall to the furnace bottom, and the waste of fuel, and the like may be prevented.

In addition, in the existing combustion device 1 including the respective three-stage solid fuel burners on the front side and the rear side of the can, it is also possible to change so that the biomass fuel is used only in the solid fuel burner 7 of the uppermost stage. Therefore, an existing combustion device 1 that uses only coal may be easily converted to the combustion device 1 that uses the biomass fuel.

Further, as shown in FIGS. 6(B) and 6(C), also in the configuration in which the numbers of stages of the solid fuel burners 7 and 7' are different before and after the can (or a configuration of including the same number of stages, but one is stopped), it is also possible to change so that the biomass fuel is used only in one solid fuel burner 7 of the uppermost stage on the front side or the rear side of the can.

Furthermore, in FIGS. 1 and 6(A) through 6(E), the configuration, in which the solid fuel burners 7 and 7' are provided in three stages in a vertical direction, has been illustrated, but it is not limited thereto. It may also be configured to have two or four or more stages.

At this time, it is desirable that the solid fuel burner 7 using the biomass fuel is provided at the uppermost stage, but it is not limited thereto. It is also possible to provide two or more stages at the uppermost stage and the middle stage.

Further, it may also be configured in such a way that, for example, as shown in FIGS. 6(D) and 6(E), one solid fuel burner 7 uses the biomass fuel, and the other solid fuel burners 7' use the pulverized coal in the uppermost stage. That is, it may also be configured in such a way that the solid fuel burner 7 using the biomass fuel and the solid fuel burners 7' using the pulverized coal face to each other.

In the above description, the embodiment of the present invention has been described in detail, but it is not limited to the above embodiment, and it is possible to perform various changes within the scope of the purport of the present invention described in claims.

For example, the configuration having the minimum diameter part 33b and the maximum diameter portion 34b has been exemplified, but a configuration without these parts is also possible.

In addition, although the configuration of the two-stage combustion gas nozzles 26 and 27 having the secondary combustion gas nozzle 26 and the tertiary combustion gas nozzle 27 has been exemplified, but it is not limited thereto, and combustion gas nozzle(s) having one stage or three or more stages are also possible.

REFERENCE SIGNS LIST

1 . . . Combustion device,
4, 4' . . . Fuel bunker,
5, 5' . . . Crusher,
7, 7' . . . Solid fuel burner,
8 . . . Fuel pipe,
21 . . . Fuel nozzle,
22 . . . Furnace,
24 . . . Flow passage of mixed fluid,
24a . . . Outer flow passage,
26, 27 . . . Combustion gas nozzle,
33 . . . Venturi
33a . . . Contraction part,
33c . . . Expansion part,
34 . . . Fuel concentrator,
36 . . . flow passage partition member,
37, 37' . . . Support member,
C1 . . . Upstream end of fuel concentrator,
D1 . . . Fuel nozzle inner diameter,
ne . . . Opening end portion of solid fuel burner on furnace side,
S2 . . . Downstream end portion of flow passage partition member,
V3 . . . Upstream end of expansion part of venturi,
V4 . . . Downstream end of expansion part of venturi.

The invention claimed is:

1. A solid fuel burner comprising:
a fuel nozzle through which a mixed fluid of solid fuel and a carrier gas thereof flows, and is opened toward a furnace;
a combustion gas nozzle which is disposed on an outer peripheral side of the fuel nozzle to spray a combustion gas;
a venturi provided in the fuel nozzle, in which a flow passage of the mixed fluid in the fuel nozzle is narrowed toward a center in a flow passage cross section;
a fuel concentrator which is provided on the center side of the fuel nozzle to impart a velocity component to the mixed fluid in a direction away from the center of the fuel nozzle; and
a flow passage partition member configured to partition the flow passage of the fuel nozzle into an inner side and an outer side in the flow passage cross section,
wherein the flow passage partition member has a shape in which a cross-sectional area of an outer flow passage is enlarged toward a downstream end rather than an upstream end,
the venturi at least has a contraction part in which a cross-sectional area of the flow passage of the mixed fluid is decreased toward the downstream side, and an expansion part disposed on the downstream side of the contraction part, in which the cross-sectional area of the flow passage of the mixed fluid is increased toward the downstream side,
an upstream end of the fuel concentrator is provided between an upstream end and a downstream end of the expansion part of the venturi, and
the cross-sectional area of the flow passage of the mixed fluid is formed so as to be monotonously increased or be the same from the upstream end of the expansion part to the opening portion of the venturi on the furnace side.

2. The solid fuel burner according to claim 1, wherein a distance between a downstream end portion of the flow passage partition member and an opening end portion of the solid fuel burner on the furnace side in a flow direction of the mixed fluid is set in a range of ½ to 2 times an inner diameter of the fuel nozzle.

3. The solid fuel burner according to claim 1, comprising the flow passage partition member which is supported by a support member from an inner wall side of the fuel nozzle.

4. The solid fuel burner according to claim 3, wherein the support member is disposed so that a plurality of plate-shaped members are disposed so as to be linear when viewed from an opening face side of the fuel nozzle.

5. The solid fuel burner according to claim 3, wherein the support member is formed to have a large width so that a flow passage width in a circumferential direction of the fuel nozzle is narrowed toward the downstream side, and after reaching a maximum width, is formed to have a small width so that the flow passage width is gradually enlarged toward the downstream side.

6. A combustion device comprising a plurality of stages in a vertical direction of a side wall surface of the furnace, and a plurality of burners provided in each stage in the furnace width direction, the combustion device comprising:

at least one solid fuel burner according to claim 1.

7. The combustion device according to claim 6, comprising one or more of the solid fuel burners in at least an uppermost stage.

* * * * *